(12) United States Patent
Nishiyama et al.

(10) Patent No.: US 10,247,459 B2
(45) Date of Patent: Apr. 2, 2019

(54) REFRIGERATION CYCLE APPARATUS

(71) Applicant: Mitsubishi Electric Corporation, Tokyo (JP)

(72) Inventors: Takumi Nishiyama, Tokyo (JP); Hideaki Maeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 15 days.

(21) Appl. No.: 15/558,304

(22) PCT Filed: May 13, 2015

(86) PCT No.: PCT/JP2015/063803
§ 371 (c)(1),
(2) Date: Sep. 14, 2017

(87) PCT Pub. No.: WO2016/181529
PCT Pub. Date: Nov. 17, 2016

(65) Prior Publication Data
US 2018/0058740 A1   Mar. 1, 2018

(51) Int. Cl.
*F25B 13/00* (2006.01)
*F25B 49/02* (2006.01)
(52) U.S. Cl.
CPC .............. *F25B 49/02* (2013.01); *F25B 13/00* (2013.01); *F25B 2313/0293* (2013.01);
(Continued)
(58) Field of Classification Search
CPC .............. F25B 13/00; F25B 2600/2513; F25B 2313/0294; F25B 2313/0293; F25B 2600/21; F25B 2600/11; F25B 2600/0253; F25B 2313/0314; F25B 2700/2106; F25B 2700/21151; F25B 2600/111;
(Continued)

(56) References Cited

U.S. PATENT DOCUMENTS

| | | |
|---|---|---|
| 6,581,397 B1 | 6/2003 | Taira et al. |
| 2013/0239602 A1 | 9/2013 | Yamashita et al. |
| 2014/0070132 A1 | 3/2014 | Fukushima |
| 2016/0075927 A1 | 3/2016 | Fukushima |

FOREIGN PATENT DOCUMENTS

| | | |
|---|---|---|
| JP | H04-003865 A | 1/1992 |
| JP | H05-039974 A | 2/1993 |
| JP | H09-324955 A | 12/1997 |
| JP | 2001-221526 A | 8/2001 |

(Continued)

OTHER PUBLICATIONS

International Search Report of the International Searching Authority dated Aug. 4, 2015 for the corresponding international application No. PCT/JP2015/063803 (and English translation).

*Primary Examiner* — Ana M Vazquez
(74) *Attorney, Agent, or Firm* — Posz Law Group, PLC

(57) ABSTRACT

A refrigeration cycle apparatus includes a refrigerant circuit including a compressor, a condenser (outdoor heat exchanger), an expansion valve, and an evaporator (indoor heat exchanger), a fan configured to blow air to the condenser, a fan configured to blow air to the evaporator, and a controller configured to control at least one of a frequency of the compressor, an opening degree of the expansion valve, a rotation speed of the fan, and a rotation speed of the fan, such that the refrigerant sucked into the compressor has a quality of 1.0 or greater. The refrigerant circuit is configured for use with a refrigerant mixture inclusive of 30 wt % to 50% wt ethylene-based hydrofluorocarbon refrigerant.

7 Claims, 10 Drawing Sheets

(52) U.S. Cl.
CPC ........... *F25B 2313/0294* (2013.01); *F25B 2313/0314* (2013.01); *F25B 2313/0315* (2013.01); *F25B 2600/0253* (2013.01); *F25B 2600/11* (2013.01); *F25B 2600/111* (2013.01); *F25B 2600/112* (2013.01); *F25B 2600/21* (2013.01); *F25B 2600/2513* (2013.01); *F25B 2700/2106* (2013.01); *F25B 2700/21151* (2013.01); *F25B 2700/21152* (2013.01); *F25B 2700/21174* (2013.01)

(58) Field of Classification Search
CPC ...... F25B 2600/112; F25B 2700/21174; F25B 2700/21152; F25B 2313/0315
See application file for complete search history.

(56) References Cited

FOREIGN PATENT DOCUMENTS

| | | |
|---|---|---|
| JP | 2005-195212 A | 7/2005 |
| JP | 2005-351588 A | 12/2005 |
| JP | 2007-085730 A | 4/2007 |
| JP | 3956589 B2 | 5/2007 |
| JP | 2007-225264 A | 9/2007 |
| JP | 2007-271214 A | 10/2007 |
| JP | 2011-137559 A | 7/2011 |
| JP | 2014-098166 A | 5/2014 |
| JP | 2014-231975 A | 12/2014 |
| WO | 2012/104892 A1 | 8/2012 |
| WO | 2015/005290 A1 | 1/2015 |

REFRIGERATION CYCLE APPARATUS

CROSS REFERENCE TO RELATED APPLICATION

This application is a U.S. national stage application of International Application No. PCT/JP2015/063803, filed on May 13, 2015, the contents of which are incorporated herein by reference.

TECHNICAL FIELD

The present invention relates to a refrigeration cycle apparatus that uses low global warming potential (GWP) refrigerant.

BACKGROUND

A particular saturated hydrofluorocarbon refrigerant, such as R32, has lower GWP and exhibits lower pressure loss than prevailing refrigerants. Accordingly, this refrigerant has been increasingly widely used in refrigeration cycle apparatuses. However, it has been found that R32 has such a property that a discharge temperature of the refrigerant discharged from a compressor is higher than those of traditional refrigerants, such as R410A. Techniques for reducing the discharge temperature have been developed.

Examples of related-art apparatuses using these techniques include a refrigeration cycle apparatus that uses refrigerant containing 70 wt % R32 and includes a refrigeration cycle including a compressor, a four-way valve, an outdoor heat exchanger, an expansion valve, a valve, an indoor heat exchanger, a gas-liquid separator, and an accumulator connected in series in that order (see, for example, Patent Literature 1). The refrigeration cycle apparatus controls the compressor or the expansion valve such that the R32-containing refrigerant sucked into the compressor has a quality of 0.65 to 0.85, thus reducing a discharge temperature of the refrigerant discharged from the compressor.

PATENT LITERATURE

Patent Literature 1: Japanese Patent No. 3956589

In the above-described refrigeration cycle apparatus disclosed in Patent Literature 1, the refrigerant in a two-phase gas-liquid state at a quality ranging from 0.65 to 0.85 is sucked into the compressor. Disadvantageously, the apparatus is operated in a liquid back state, in which liquid refrigerant flows into the compressor.

Such an operation in the liquid back state causes the liquid refrigerant that has flowed into the compressor to mix with refrigerating machine oil in the compressor, resulting in a reduction in viscosity of the refrigerating machine oil. A reduction in viscosity of the refrigerating machine oil increases the likelihood that sliding parts of the compressor may wear and the likelihood that these parts may degrade and fail due to heat generation.

If the refrigerant on a suction side of the compressor is completely gasified so that the liquid back is prevented, the discharge temperature of the refrigerant containing 70% or more R32 refrigerant is approximately 10 to 20 degrees C. higher than that of R410A. Disadvantageously, the discharge temperature may exceed 120 degrees C., which is a heat resistance temperature of motor parts. Furthermore, a high discharge temperature may promote degradation of the refrigerating machine oil, a material of the compressor, coating of the compressor, and a substrate of the compressor, resulting in a reduction in long-term reliability of the compressor.

In recent years, the use of ethylene-based hydrofluorocarbon refrigerant as low GWP refrigerant other than R32 has been proposed. However, it is difficult to overcome disadvantages arising from the liquid back and an increase in discharge temperature in a refrigeration cycle apparatus using R32 refrigerant by merely replacing the R32 refrigerant with ethylene-based hydrofluorocarbon refrigerant.

SUMMARY

The present invention has been made to overcome the above-described disadvantages, and aims to provide a refrigeration cycle apparatus that uses ethylene-based hydrofluorocarbon refrigerant, the refrigeration cycle apparatus being capable of reducing or eliminating an increase in discharge temperature while preventing liquid back, and capable of achieving low GWP.

An embodiment of the present invention provides a refrigeration cycle apparatus including a refrigerant circuit including a compressor, a condenser, a pressure reducing device, and an evaporator, a first fan configured to blow air to the condenser, a second fan configured to blow air to the evaporator, and a controller configured to control at least one of a frequency of the compressor, an opening degree of the pressure reducing device, a rotation speed of the first fan, and a rotation speed of the second fan, such that the refrigerant sucked into the compressor has a quality of 1.0 or greater. The refrigerant circuit is configured for use with a refrigerant mixture inclusive of 30 wt % to 50 wt % ethylene-based hydrofluorocarbon refrigerant.

An embodiment of the present invention provides a refrigeration cycle apparatus including a refrigerant circuit including a compressor, a condenser, a pressure reducing device, and an evaporator, a first fan configured to blow air to the condenser, a second fan configured to blow air to the evaporator, an outdoor air temperature detecting unit configured to detect an outdoor air temperature, and a controller configured to control at least one of a frequency of the compressor, an opening degree of the pressure reducing device, a rotation speed of the first fan, and a rotation speed of the second fan, such that the refrigerant sucked into the compressor has a degree of superheat lower than or equal to the outdoor air temperature detected by the outdoor air temperature detecting unit. The refrigerant circuit is configured for use with a refrigerant mixture inclusive of 30 wt % to 70 wt % ethylene-based hydrofluorocarbon refrigerant.

According to an embodiment of the present invention, a refrigeration cycle apparatus that uses ethylene-based hydrofluorocarbon refrigerant, that is capable of reducing or eliminating an increase in discharge temperature while preventing liquid back, and that is capable of achieving low GWP can be provided.

DETAILED DESCRIPTION

Figure 1:
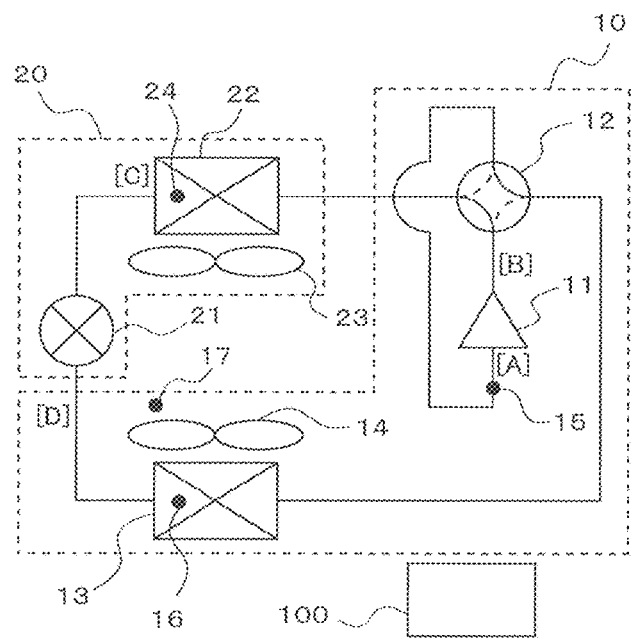
FIG. 1 is a diagram illustrating a refrigerant circuit of an air-conditioning apparatus according to Embodiment 1 of the present invention.

Embodiments of the present invention will be described below with reference to the drawings. Embodiments, which will be described below, are not intended to limit the present invention. Note that components designated by the same reference signs in the drawings are the same components or equivalents. This note applies to Embodiments described below. Furthermore, note that the forms of components described in the specification are intended to be illustrative only and are not intended to be limited to those described in the specification. In addition, high and low values of temperature, pressure, or other parameters are not determined in relation to a particular absolute value, but are relatively determined based on, for example, a state or an operation of, for example, a system or an apparatus.

An exemplary configuration of an air-conditioning apparatus as an example of a refrigeration cycle apparatus will be described below.

Embodiment 1

FIG. 1 is a diagram illustrating a refrigerant circuit of the air-conditioning apparatus according to Embodiment 1 of the present invention.

The air-conditioning apparatus includes an outdoor unit 10 and an indoor unit 20. The outdoor unit 10 includes a compressor 11, a four-way valve 12, an outdoor heat exchanger 13, and an outdoor fan 14 that blows air to the outdoor heat exchanger 13. The outdoor unit 10 further includes a temperature detecting unit 15 and a temperature detecting unit 16.

The indoor unit 20 includes an expansion valve 21, an indoor heat exchanger 22, an indoor fan 23 that blows air to the indoor heat exchanger 22, and a temperature detecting unit 24. Although the expansion valve 21 is used as a pressure reducing device in this configuration, any other pressure reducing device, such as a capillary tube, may be used.

The compressor 11, the four-way valve 12, the indoor heat exchanger 22, the expansion valve 21, and the outdoor heat exchanger 13 are connected by refrigerant pipes, thus forming the refrigerant circuit through which refrigerant is circulated. The air-conditioning apparatus including this refrigerant circuit cools or heats an indoor space by switching the four-way valve 12. In a heating operation, the indoor heat exchanger 22 serves as a condenser and the outdoor heat exchanger 13 serves as an evaporator. The indoor heat exchanger 22 serves as an evaporator and the outdoor heat exchanger 13 serves as a condenser. The air-conditioning apparatus illustrated in FIG. 1 includes a minimum number of components that achieve the cooling or heating operation. The air-conditioning apparatus may further include other devices, such as a pressure gauge, a gas-liquid separator, a receiver, and an accumulator.

Figure 2:
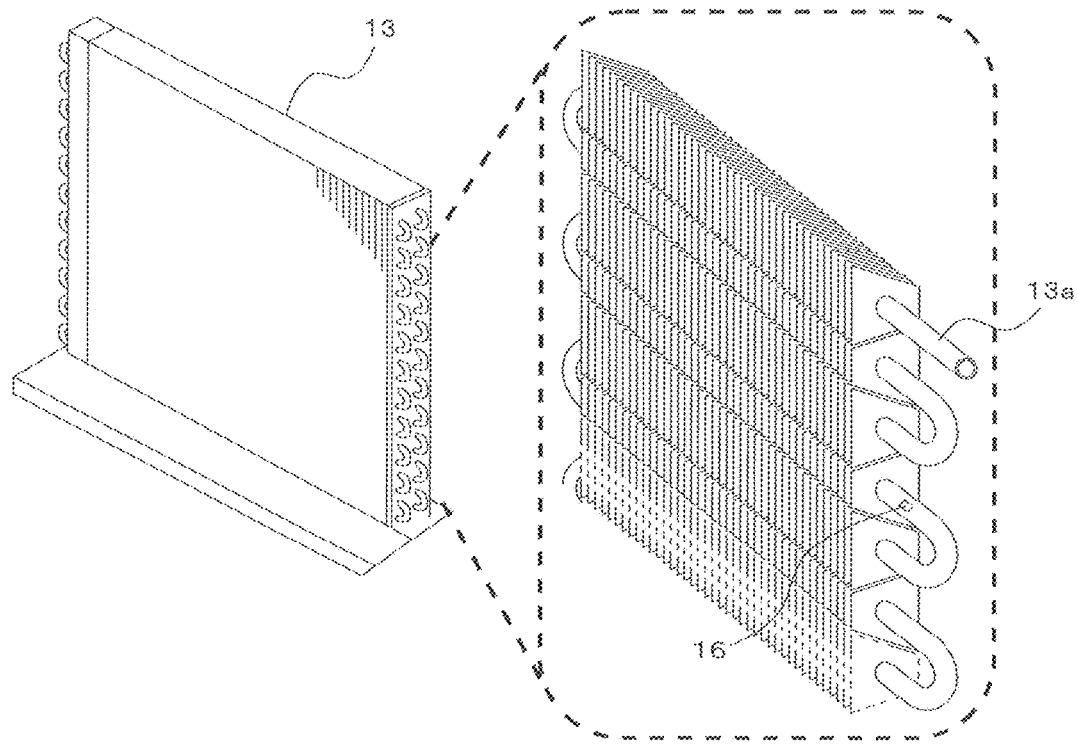
FIG. 2 is a schematic perspective view of an outdoor heat exchanger of the air-conditioning apparatus according to Embodiment 1 of the present invention.

FIG. 2 is a schematic perspective view of the outdoor heat exchanger of the air-conditioning apparatus according to Embodiment 1 of the present invention.

The outdoor heat exchanger 13 is a heat exchanger including heat transfer tubes or pipes 13a, each constituted by a cylindrical pipe or a flat multi-hole pipe, made mainly of copper or aluminum. Like the outdoor heat exchanger 13, the indoor heat exchanger 22 is a heat exchanger including heat transfer tubes or pipes, each constituted by a cylindrical pipe or a flat multi-hole pipe, made mainly of copper or aluminum.

The temperature detecting units (temperature sensors) arranged in the air-conditioning apparatus will now be described.

The temperature detecting unit 15 is attached to an outer surface of the pipe located between a suction side of the compressor 11 and the four-way valve 12. The temperature detecting unit 15 detects a suction temperature of the compressor 11. The temperature detecting unit 16 is attached to the pipe included in the outdoor heat exchanger 13 so as to be located substantially intermediate the length of the pipe as illustrated in FIG. 2. The temperature detecting unit 16 detects an evaporating temperature in the heating operation and a condensing temperature in the cooling operation. The temperature detecting unit 24 is attached to an outer surface of the pipe included in the indoor heat exchanger 22 so as to be located substantially intermediate the length of the pipe. The temperature detecting unit 24 detects a condensing temperature in the heating operation and an evaporating temperature in the cooling operation. The attachment positions of the temperature detecting units 16 and 24 are not limited to the above-described positions. The temperature detecting unit 16 may be disposed at any position where the unit can detect an evaporating temperature in the heating operation and a condensing temperature in the cooling operation. The temperature detecting unit 24 may be disposed at any position where the unit can detect a condensing temperature in the heating operation and an evaporating temperature in the cooling operation. Furthermore, a plurality of temperature detecting units may be arranged in the above-described sections in which the temperature detecting unit 24 is attached.

For the attachment position of the temperature detecting unit 15, the temperature detecting unit 15 is preferably disposed at a position just prior to a suction inlet of the compressor 11 so that a suction temperature of the compressor 11 is accurately detected. The temperature detecting unit 16 is preferably disposed between an inlet of the outdoor heat exchanger 13 in the heating operation and the location intermediate the length of the pipe included in the outdoor heat exchanger 13. The reason is as follows: the temperature detecting unit 16 disposed between the inlet of the outdoor heat exchanger 13 in the heating operation and the location intermediate the length of the pipe included in the outdoor heat exchanger 13 can reliably detect an evaporator inlet-side temperature (evaporating temperature of the refrigerant in a two-phase state), and the degree of suction superheat, or suction SH can be accurately calculated. The temperature detecting unit 24 is preferably disposed between an outlet of the indoor heat exchanger 22 in the heating operation and the location intermediate the length of the pipe included in the indoor heat exchanger 22. The reason is as follows: the temperature detecting unit 24 disposed between an outlet of the indoor heat exchanger 22 in the heating operation and the location intermediate the length of the pipe included in the indoor heat exchanger 22 can reliably detect an evaporator inlet-side temperature in the cooling operation, and the suction SH can be accurately calculated.

In this case, the apparatus includes the four-way valve 12 and is accordingly capable of switching between the cooling and heating operations. The four-way valve 12 may be optionally included. In such a case, the temperature detecting unit 15 may be attached to the pipe located between the outlet of the evaporator and the suction inlet of the compressor 11 and detect a suction temperature. The temperature detecting unit 16 may be attached to the pipe located between an outlet of the expansion valve 21 and the outlet of the evaporator and detect an evaporating temperature. The temperature detecting unit (first temperature detecting unit) 15 and the temperature detecting unit (second temperature detecting unit) 16 constitute a suction superheat degree detecting unit in the present invention.

The air-conditioning apparatus further includes a controller 100 that controls the entire air-conditioning apparatus. The controller 100 is constituted by, for example, a microcomputer, and includes a central processing unit (CPU), a random access memory (RAM), and a read-only memory (ROM). The ROM stores a control program and a program corresponding to a flowchart of FIG. 10, which will be described later.

The controller 100 is connected to the temperature detecting unit 15, the temperature detecting unit 16, and the temperature detecting unit 24 such that the controller 100 can receive detection signals from these temperature detecting units. In addition, the controller 100 is connected to the compressor 11, the four-way valve 12, the expansion valve 21, and the indoor fan 23. The controller 100 controls at least one of a frequency of the compressor 11, an opening degree of the expansion valve 21, a rotation speed of the outdoor fan 14, and a rotation speed of the indoor fan 23 on the basis of, for example, detection signals from the temperature detecting units.

Furthermore, the controller 100 controls at least one of the frequency of the compressor 11, the opening degree of the expansion valve 21, the rotation speed of the outdoor fan 14, and the rotation speed of the indoor fan 23 in consideration of, for example, an outdoor air temperature detected by an outdoor air temperature detecting unit 17 constituted by, for example, a temperature sensor, such that an indoor temperature detected by an indoor temperature detecting unit (not illustrated) reaches a set target temperature.

Although FIG. 1 illustrates the configuration with the single controller 100, the functions of the controller 100 may be divided such that the outdoor unit 10 and the indoor unit 20 each have a controller, and the controllers may perform processes in cooperation with each other.

An outline of control in Embodiment 1 will now be described.

According to Embodiment 1, to prevent, for example, degradation of the material of the compressor 11 and degradation of oil in the compressor 11, an operation is performed such that a discharge temperature of the compressor 11 is an upper temperature limit or lower. In this case, it is assumed that the upper temperature limit is 120 degrees C., which is a reference heat resistance temperature of electrical appliances defined by Electrical Appliance and Material Safety Law. It is more preferable that the upper temperature limit be set to 90 degrees C., which is lower than the above value, for long-term reliability.

As regards a refrigerant state, refrigerant having a quality of 1.0 or greater is in a superheated gas state. To prevent liquid back to the compressor 11, therefore, the operation is performed such that the quality of the refrigerant sucked into the compressor 11 is at least 1.0 or greater. Specifically, a target value of the degree of superheat on the suction side, or suction superheat degree (hereinafter, referred to as "suction SH") is set to 0 or higher such that the refrigerant sucked into the compressor 11 has a quality of 1.0 or greater, and the operation is performed such that the suction SH is 0 or greater. If the suction SH is high, the discharge temperature of the compressor 11 rises. The operation is therefore performed such that the discharge temperature does not exceed 120 degrees C., which is the upper temperature limit, during the operation and the suction SH is 0 or higher.

In this case, the suction SH in the heating operation is obtained as the difference between a temperature detected by the temperature detecting unit 15 and a temperature detected by the temperature detecting unit 16. In addition, the suction SH in the cooling operation is obtained as the difference between a temperature detected by the temperature detecting unit 15 and a temperature detected by the temperature detecting unit 24.

Although the upper temperature limit of the discharge temperature is 120 degrees C. as described above, a lower temperature limit is determined as follows. Reducing the discharge temperature reduces the degree of superheat on a discharge side, or discharge superheat degree (hereinafter, referred to as "discharge SH"), which is calculated by subtracting a saturated gas temperature, based on a pressure upon discharge, from the discharge temperature. Refrigerating machine oil having substantially the same temperature as the discharge temperature of the compressor 11 is discharged from the compressor 11. Typically, the lower the temperature of the refrigerating machine oil is, the larger the amount of refrigerant dissolved in the refrigerating machine oil is. This leads to a reduction in viscosity of the refrigerating machine oil, so that sliding parts of the compressor tend to wear and generate heat. The lower temperature limit of the discharge temperature is accordingly determined so that such disadvantages do not arise. Specifically, a discharge SH of 10 degrees C. or higher is secured, and a discharge temperature calculated by using this discharge SH is set to the lower temperature limit. In this case, the discharge temperature calculated by using the discharge SH in the heating operation is a temperature obtained by adding the discharge SH to a temperature detected by the temperature detecting unit 24, and the discharge temperature calculated by using the discharge SH in the cooling operation is a temperature obtained by adding the discharge SH to a temperature detected by the temperature detecting unit 24, in the cooling operation is a temperature obtained by adding the discharge SH to a temperature detected by the temperature detecting unit 16.

To achieve the above-described operation in the use of ethylene-based hydrofluorocarbon refrigerant, Embodiment 1 uses a refrigerant mixture inclusive of 30 wt % to 50 wt % ethylene-based hydrofluorocarbon refrigerant. The reason this mixing ratio is used will be described in detail later.

Figure 3:
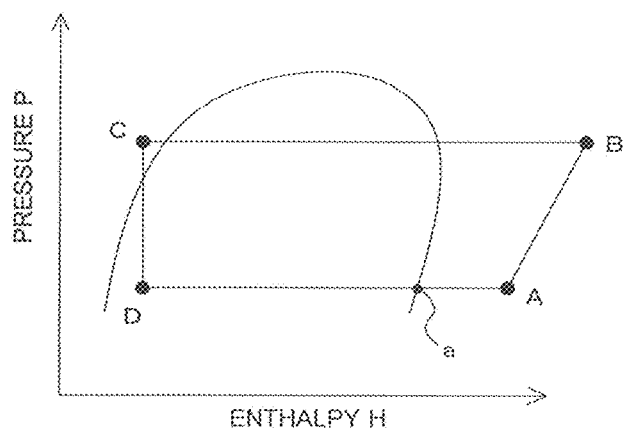
FIG. 3 is a p-h diagram of the air-conditioning apparatus according to Embodiment 1 of the present invention.

FIG. 3 is a schematic graph illustrating a p-h diagram of the air-conditioning apparatus according to Embodiment 1 of the present invention. In FIG. 3, points A to D represent refrigerant states at positions A to D in FIG. 1.

As is apparent from FIG. 3, the temperature of the refrigerant is highest on the discharge side (the point B) of the compressor 11 in the air-conditioning apparatus. When a suction temperature (temperature at the point A) detected by the temperature detecting unit 15 is equal to or lower than the saturated gas temperature (temperature at a point a), the liquid back state is caused.

Refrigeration cycle operations of the air-conditioning apparatus will now be described with reference to FIG. 3.

(Heating Operation)

For the heating operation, the four-way valve 12 is switched to a state indicated by solid lines in FIG. 1. In the air-conditioning apparatus in the heating operation, the refrigerant is compressed into high temperature, high pressure gas refrigerant by the compressor 11 and is sent through the four-way valve 12 into the indoor heat exchanger 22. The refrigerant that has flowed into the indoor heat exchanger 22 exchanges heat with indoor air delivered by the indoor fan 23 such that the refrigerant transfers heat to the air, and thus liquefies. The liquefied refrigerant is reduced in pressure by the expansion valve 21 such that the refrigerant turns into a two-phase gas-liquid state. The refrigerant flows into the outdoor heat exchanger 13. The refrigerant that has flowed into the outdoor heat exchanger 13 exchanges heat with outdoor air delivered by the outdoor fan 14 such that the refrigerant removes heat from the air, and thus gasifies. The refrigerant is returned to the compressor 11. The refrigerant is circulated through the refrigerant circuit in the above-described manner, thus achieving the heating operation.

(Cooling Operation)

For the cooling operation, the four-way valve 12 is switched to a state indicated by dashed lines in FIG. 1. In the air-conditioning apparatus in the cooling operation, the refrigerant is compressed into high temperature, high pressure gas refrigerant by the compressor 11 and is sent through the four-way valve 12 into the outdoor heat exchanger 13. The refrigerant that has flowed into the outdoor heat exchanger 13 exchanges heat with outdoor air delivered by the outdoor fan 14 such that the refrigerant transfers heat to the air, and thus liquefies. The liquefied refrigerant is reduced in pressure by the expansion valve 21 such that the refrigerant turns into a two-phase gas-liquid state. The refrigerant flows into the indoor heat exchanger 22. The refrigerant that has flowed into the indoor heat exchanger 22 exchanges heat with indoor air delivered by the indoor fan 23 such that the refrigerant removes heat from the air, and thus gasifies. The refrigerant is returned to the compressor 11. The refrigerant is circulated through the refrigerant circuit in the above-described manner, thus achieving the cooling operation.

The refrigerant will now be described. For ethylene-based hydrofluorocarbon refrigerant, R1123 is preferably used because its normal boiling point is low. As regards refrigerant to be mixed with R1123, it is preferred to use R32 refrigerant, whose boiling point is close to that of R1123. As refrigerant constituting the rest of the refrigerant, refrigerant typically used in air-conditioning apparatuses, such as R410A or R407C, may be used instead of the above-described R32 refrigerant. For example, assuming that the mixing ratio of R1123 is 30 wt %, the rest (70 wt %) of the refrigerant may be a mixture of refrigerants, for example, may contain 50 wt % R32 refrigerant and 20 wt % R410A.

Ethylene-based hydrofluorocarbon refrigerant, in particular, R1123 is preferably used for the following reasons.
(1) R1123 has a boiling point (−57 degrees C.) close to that of R32 and is high pressure refrigerant equivalent to R32.
(2) When R1123 is mixed with R32, the refrigerant mixture can serve as a near-azeotropic refrigerant mixture because these refrigerants have boiling points close to each other.
(3) The GWP of R1123 is zero (GWP can be reduced by mixing R32 with R1123).
  →Although GWP is reduced by mixing R32 with HFO1234yf, the mixture of R32 and HFO1234yf is a non-azeotropic refrigerant mixture.

(4) When R1123 is mixed with R32, the discharge temperature of the refrigerant mixture can be lower than that of R32 as a single refrigerant.

(5) R1123 is non-toxic and non-carcinogenic.

An outline of the reason the mixing concentration of ethylene-based hydrofluorocarbon refrigerant is 30 wt % or more and 50 wt % or less will now be described with reference to FIGS. 4 and 5.

Figure 4:
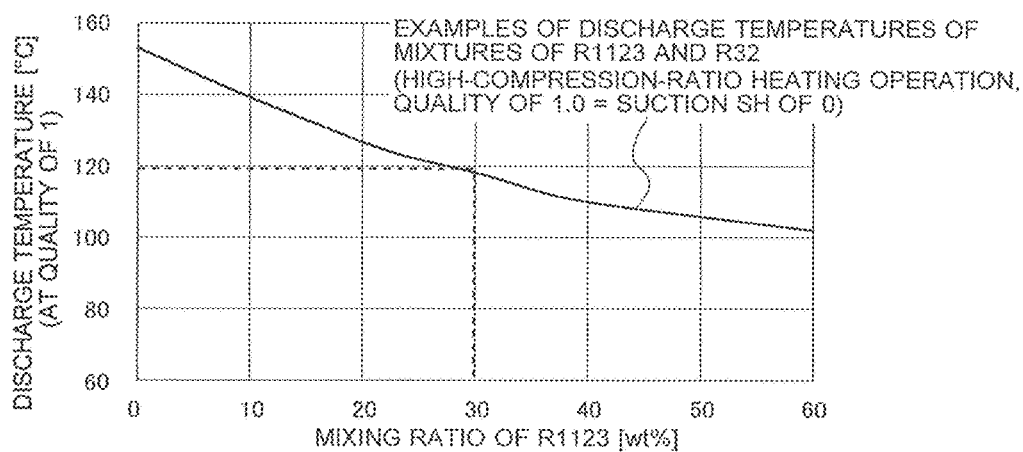
FIG. 4 is a graph illustrating the relationship between the mixing ratio of R1123 refrigerant and a discharge temperature in the air-conditioning apparatus of FIG. 1.

FIG. 4 is a graph illustrating the relationship between the mixing ratio of R1123 refrigerant and the discharge temperature in the air-conditioning apparatus of FIG. 1. The graph of FIG. 4 illustrates the heating operation at a high compression ratio. FIG. 5 is a graph illustrating the relationship between the mixing ratio of R1123 refrigerant and the discharge SH in the air-conditioning apparatus of FIG. 1. In FIGS. 4 and 5, the refrigerant mixed with R1123 refrigerant is R32 refrigerant. The graphs of FIGS. 4 and 5 illustrate a case where the refrigerant sucked into the compressor 11 has a quality of 1.0.

As illustrated in FIG. 4, it is preferred that the mixing ratio of R1123 be 30 wt % or more and the mixing ratio of R32 be 70 wt % or less so that, when the refrigerant sucked into the compressor 11 has a quality of 1.0, the compressor discharge temperature is lower than or equal to 120 degrees C., which is a heat resistance temperature of motor parts. Although FIG. 4 illustrates the graph at a quality of 1.0, the graph of FIG. 4 is shifted upward as the quality increases, whereas the graph of FIG. 4 is shifted downward as the quality decreases.

Figure 5:
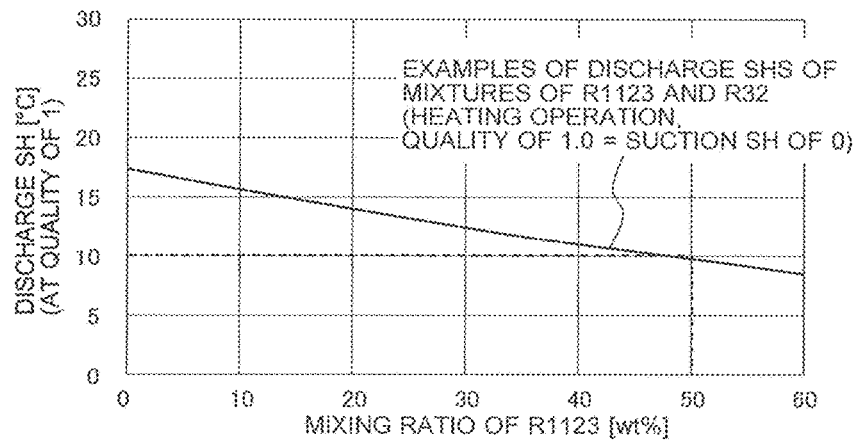
FIG. 5 is a graph illustrating the relationship between the mixing ratio of the R1123 refrigerant and the degree of discharge superheat, or discharge SH in the air-conditioning apparatus of FIG. 1.

As illustrated in FIG. 5, it is preferred that the mixing ratio of R1123 be 50 wt % or less and the mixing ratio of R32 be 50 wt % or more so that the discharge SH at a quality of 1.0 is 10 degrees C. or higher. Although FIG. 5 illustrates the graph at a quality of 1.0, the graph of FIG. 5 is shifted upward as the quality increases, whereas the graph of FIG. 5 is shifted downward as the quality decreases.

As described above, the mixing ratio of ethylene-based hydrofluorocarbon refrigerant is set such that, when the refrigerant sucked into the compressor 11 has a quality of at least 1.0, the discharge temperature of the compressor 11 is 120 degrees C. or lower and the discharge SH is 10 degrees C. or higher.

The reason the mixing concentration of ethylene-based hydrofluorocarbon refrigerant is 30 wt % or more and 50 wt % or less will be further described based on detailed data.

Figure 6A:
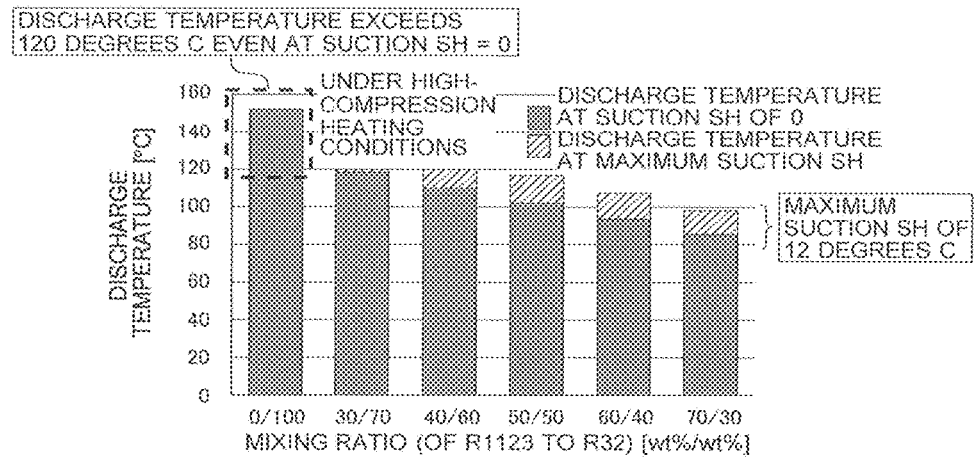
FIG. 6A is a graph illustrating discharge temperatures in operations under high-compression heating conditions with varied mixing ratios at a quality of 1 at a suction inlet of a compressor in the air-conditioning apparatus of FIG. 1.
Figure 6B:
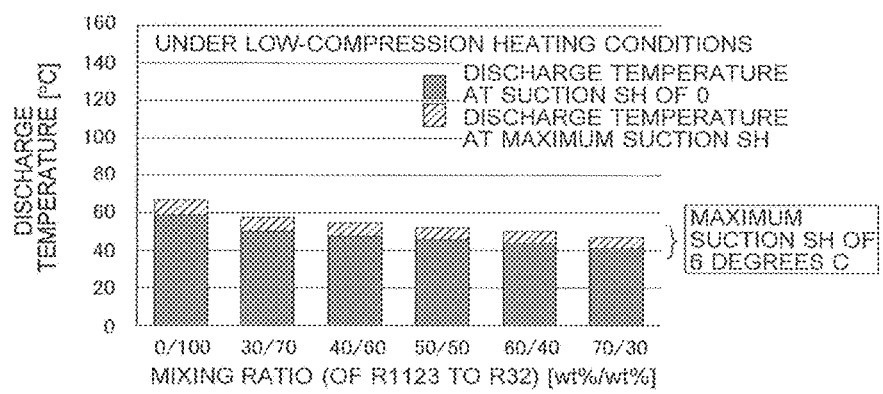
FIG. 6B is a graph illustrating discharge temperatures in operations under low-compression heating conditions with varied mixing ratios at a quality of 1 at the suction inlet of the compressor in the air-conditioning apparatus of FIG. 1.
Figure 6C:
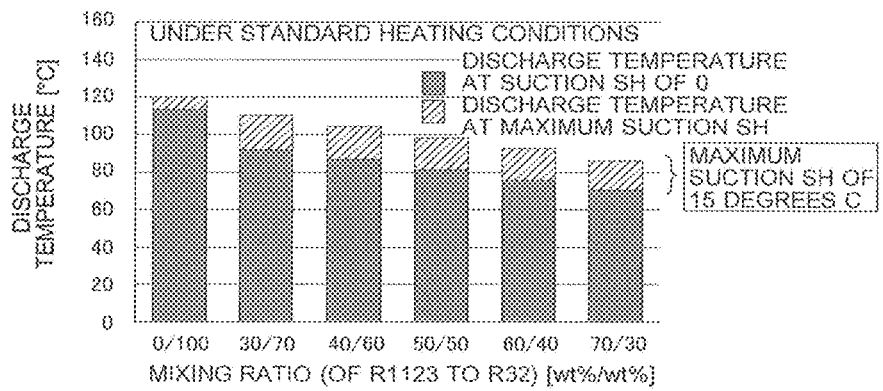
FIG. 6C is a graph illustrating discharge temperatures in operations under standard heating conditions with varied mixing ratios at a quality of 1 at the suction inlet of the compressor in the air-conditioning apparatus of FIG. 1.
Figure 6D:
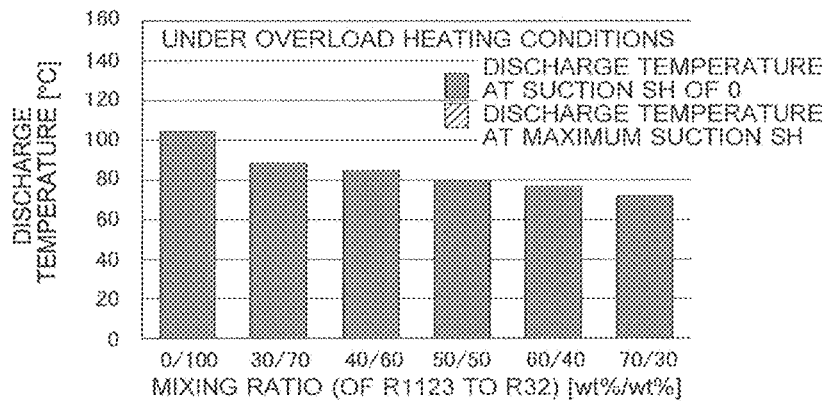
FIG. 6D is a graph illustrating discharge temperatures in operations under overload heating conditions with varied mixing ratios at a quality of 1 at the suction inlet of the compressor in the air-conditioning apparatus of FIG. 1.

FIG. 6A is a graph illustrating discharge temperatures in operations under high-compression heating conditions with varied mixing ratios at a quality of 1 at the suction inlet of the compressor in the air-conditioning apparatus of FIG. 1. FIG. 6B is a graph illustrating discharge temperatures in operations under low-compression heating conditions with varied mixing ratios at a quality of 1 at the suction inlet of the compressor in the air-conditioning apparatus of FIG. 1. FIG. 6C is a graph illustrating discharge temperatures in operations under standard heating conditions with varied mixing ratios at a quality of 1 at the suction inlet of the compressor in the air-conditioning apparatus of FIG. 1. FIG. 6D is a graph illustrating discharge temperatures in operations under overload heating conditions with varied mixing ratios at a quality of 1 at the suction inlet of the compressor in the air-conditioning apparatus of FIG. 1.

In FIGS. 6A to 6D, the horizontal axis represents the mixing ratio of R1123 to R32 [wt %/wt %] and the vertical axis represents the discharge temperature [degrees C.]. In FIGS. 6A to 6D, each filled block indicates a discharge temperature at a suction SH of 0 and each obliquely hatched block indicates a discharge temperature at a maximum suction SH. The maximum suction SH varies depending on outdoor air temperature. In FIG. 6A, the maximum suction SH is 12 degrees C. under the high-compression heating conditions. In FIG. 6B, the maximum suction SH is 6 degrees C. under the low-compression heating conditions. In FIG. 6C, the maximum suction SH is 15 degrees C. under the standard heating conditions.

As is apparent from FIGS. 6A to 6D, a discharge temperature of 120 degrees C. or lower can be provided under any of the operation conditions, provided that the mixing ratio of R1123 is 30 wt % or more. In other words, 30 wt % is a minimum mixing ratio of R1123 at which a discharge temperature of 120 degrees C. or lower can be provided. If the mixing ratio of R1123 is 30 wt % or more, the discharge temperature can be 120 degrees C. or lower. In contrast, when the mixing ratio is 0/100, that is, the refrigerant contains only R32, which is traditional refrigerant, the discharge temperature exceeds 120 degrees C. even at a suction SH of 0, as illustrated in FIG. 6A.

Figure 7A:
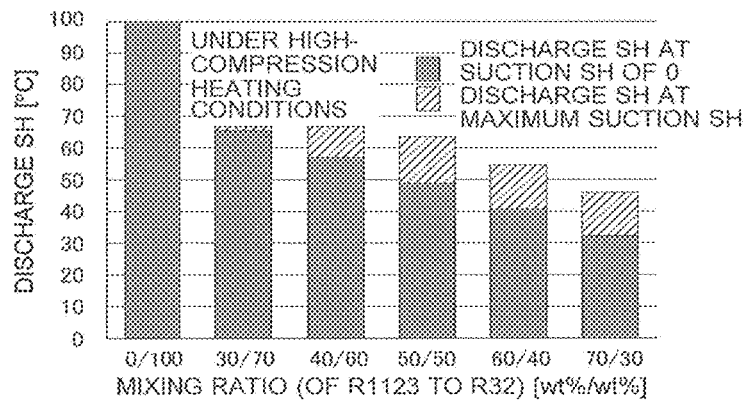
FIG. 7A is a graph illustrating discharge SHs in operations under high-compression heating conditions with varied mixing ratios at a quality of 1 at the suction inlet of the compressor in the air-conditioning apparatus of FIG. 1.
Figure 7B:
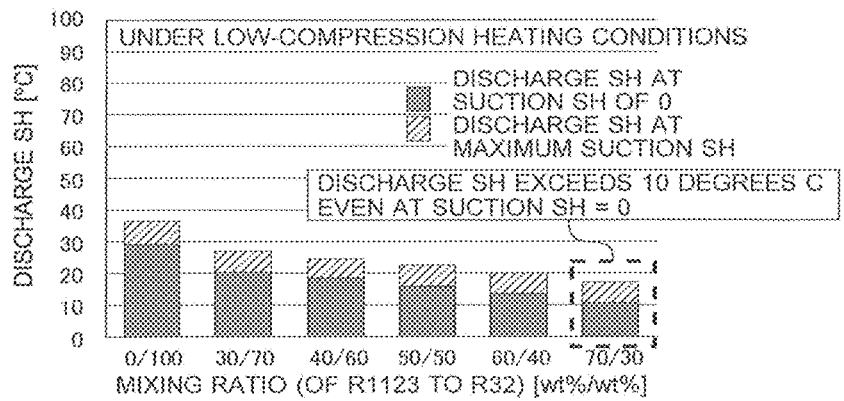
FIG. 7B is a graph illustrating discharge SHs in operations under low-compression heating conditions with varied mixing ratios at a quality of 1 at the suction inlet of the compressor in the air-conditioning apparatus of FIG. 1.
Figure 7C:
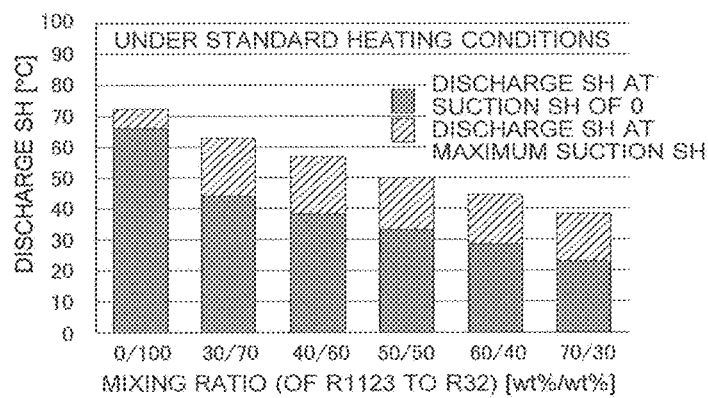
FIG. 7C is a graph illustrating discharge SHs in operations under standard heating conditions with varied mixing ratios at a quality of 1 at the suction inlet of the compressor in the air-conditioning apparatus of FIG. 1.
Figure 7D:
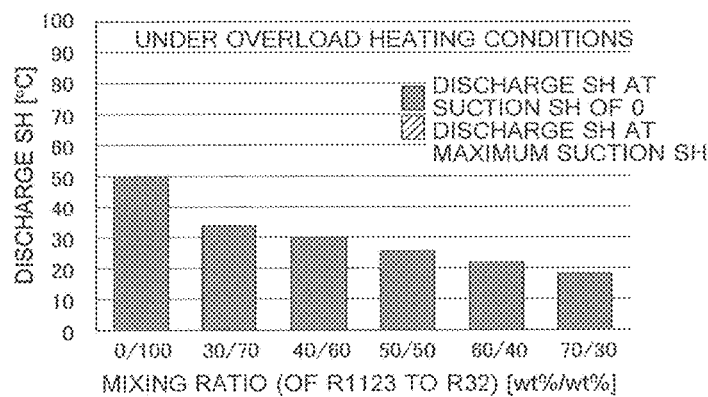
FIG. 7D is a graph illustrating discharge SHs in operations under overload heating conditions with varied mixing ratios at a quality of 1 at the suction inlet of the compressor in the air-conditioning apparatus of FIG. 1.

FIG. 7A is a graph illustrating discharge SHs in operations under high-compression heating conditions with varied mixing ratios at a quality of 1 at the suction inlet of the compressor in the air-conditioning apparatus of FIG. 1. FIG. 7B is a graph illustrating discharge SHs in operations under low-compression heating conditions with varied mixing ratios at a quality of 1 at the suction inlet of the compressor in the air-conditioning apparatus of FIG. 1. FIG. 7C is a graph illustrating discharge SHs in operations under standard heating conditions with varied mixing ratios at a quality of 1 at the suction inlet of the compressor in the air-conditioning apparatus of FIG. 1. FIG. 7D is a graph illustrating discharge SHs in operations under overload heating conditions with varied mixing ratios at a quality of 1 at the suction inlet of the compressor in the air-conditioning apparatus of FIG. 1.

In FIGS. 7A to 7D, the horizontal axis represents the mixing ratio of R1123 to R32 [wt %/wt %] and the vertical axis represents the discharge SH [degrees C.]. In FIGS. 7A to 7D, each filled block indicates a discharge SH at a suction SH of 0 and each obliquely hatched block indicates a discharge SH at a maximum suction SH.

As is apparent from FIGS. 7A to 7D, a discharge SH of 10 degrees C. or higher is provided under any of the operation conditions, provided that the mixing ratio of R1123 is 70 wt % or less. In other words, it is apparent that 70 wt % is a maximum mixing ratio of R1123 at which the discharge SH can be 10 degrees C. or higher under any of the operation conditions. When the mixing ratio of R1123 is more than 70 wt %, a discharge SH of 10 degrees C. or higher fails to be provided at a suction SH of 0 (a quality of 1.0).

Figure 8A:
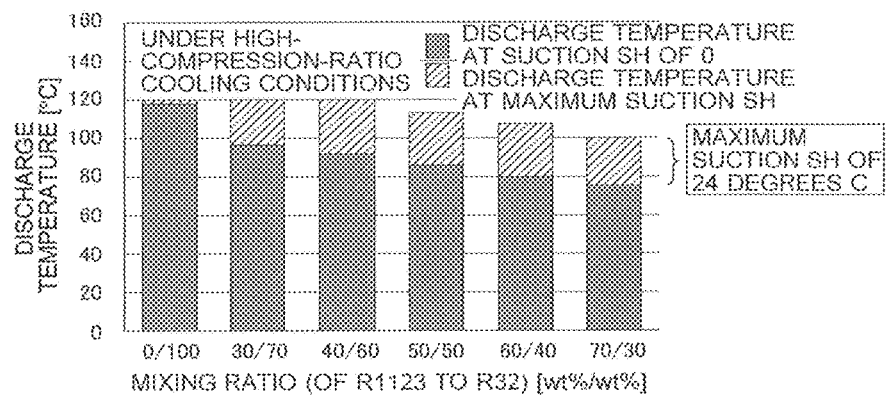
FIG. 8A is a graph illustrating discharge temperatures in operations under high-compression cooling conditions with varied mixing ratios at a quality of 1 at the suction inlet of the compressor in the air-conditioning apparatus of FIG. 1.
Figure 8B:
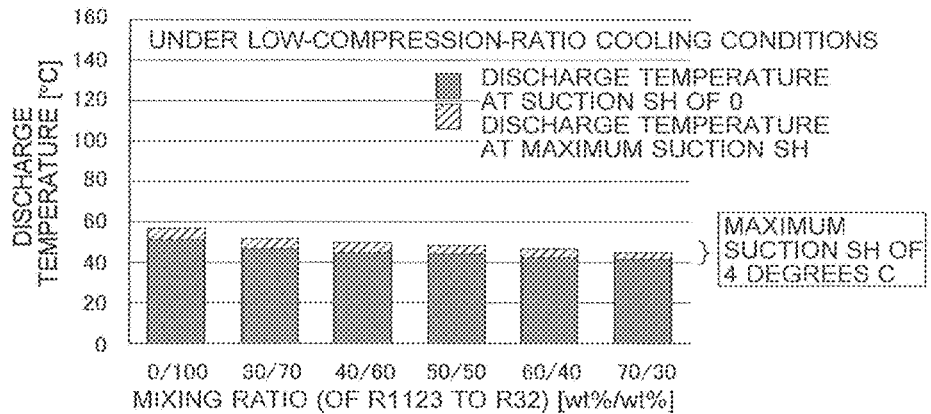
FIG. 8B is a graph illustrating discharge temperatures in operations under low-compression cooling conditions with varied mixing ratios at a quality of 1 at the suction inlet of the compressor in the air-conditioning apparatus of FIG. 1.
Figure 8C:
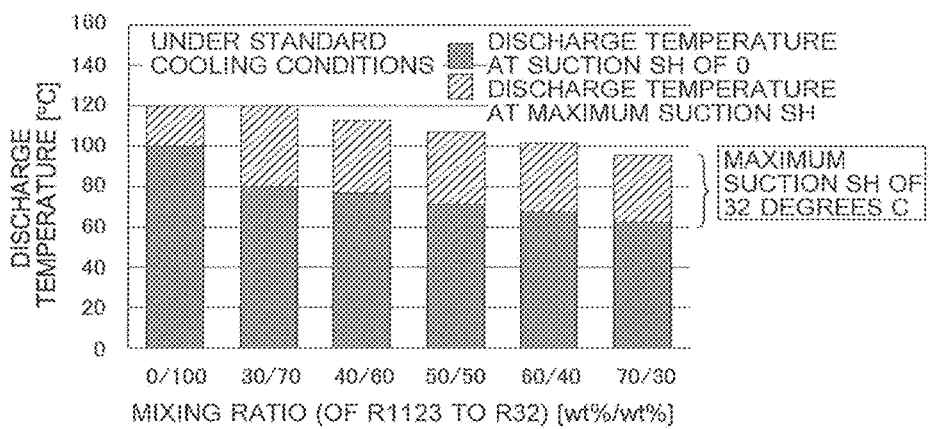
FIG. 8C is a graph illustrating discharge temperatures in operations under standard cooling conditions with varied mixing ratios at a quality of 1 at the suction inlet of the compressor in the air-conditioning apparatus of FIG. 1.
Figure 8D:
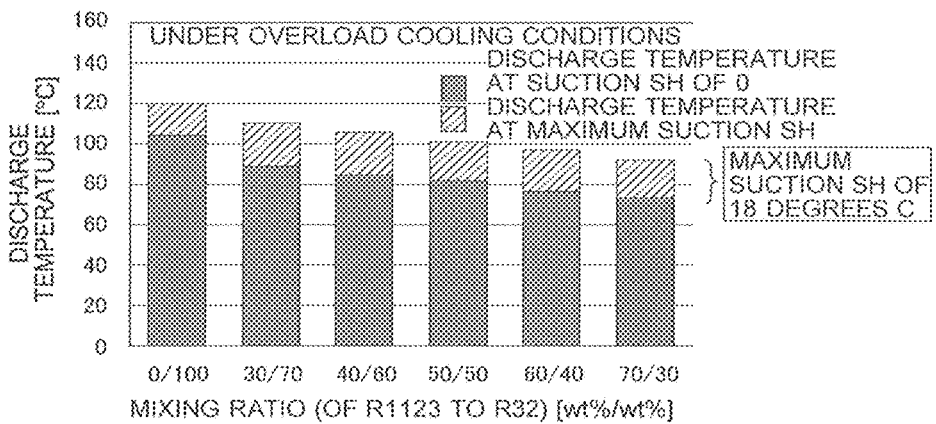
FIG. 8D is a graph illustrating discharge temperatures in operations under overload cooling conditions with varied mixing ratios at a quality of 1 at the suction inlet of the compressor in the air-conditioning apparatus of FIG. 1.

FIG. 8A is a graph illustrating discharge temperatures in operations under high-compression cooling conditions with varied mixing ratios at a quality of 1 at the suction inlet of the compressor in the air-conditioning apparatus of FIG. 1. FIG. 8B is a graph illustrating discharge temperatures in operations under low-compression cooling conditions with varied mixing ratios at a quality of 1 at the suction inlet of the compressor in the air-conditioning apparatus of FIG. 1. FIG. 8C is a graph illustrating discharge temperatures in operations under standard cooling conditions with varied mixing ratios at a quality of 1 at the suction inlet of the compressor in the air-conditioning apparatus of FIG. 1. FIG. 8D is a graph illustrating discharge temperatures in operations under overload cooling conditions with varied mixing ratios at a quality of 1 at the suction inlet of the compressor in the air-conditioning apparatus of FIG. 1.

In FIGS. 8A to 8D, the horizontal axis represents the mixing ratio of R1123 to R32 [wt %/wt %] and the vertical axis represents the discharge temperature [degrees C.]. In FIGS. 8A to 8D, each filled block indicates a discharge temperature at a suction SH of 0 and each obliquely hatched block indicates a discharge temperature at a maximum suction SH. The maximum suction SH varies depending on outdoor air temperature. In FIG. 8A, the maximum suction SH under the high-compression cooling conditions is 24 degrees C. In FIG. 8B, the maximum suction SH under the low-compression cooling conditions is 4 degrees C. In FIG. 8C, the maximum suction SH under the standard cooling conditions is 32 degrees C. In FIG. 8D, the maximum suction SH under the overload cooling conditions is 18 degrees C.

As is apparent from FIGS. 8A to 8D, the discharge temperatures in the cooling operations generally tend to be lower than those in the heating operations. The discharge temperatures under all of the cooling operation conditions are lower than or equal to 120 degrees C. When the mixing ratio of R1123 is 0 wt %, that is, when the refrigerant contains only R32, which is traditional refrigerant, the discharge temperature is 120 degrees C. or lower in the cooling operations. However, when the mixing ratio of R1123 is less than 30 wt %, the discharge temperature exceeds 120 degrees C. under the heating conditions at a quality of 1.0 or greater, as described above. Therefore, the mixing ratio of R1123 has to be at least 30 wt %.

Figure 9A:
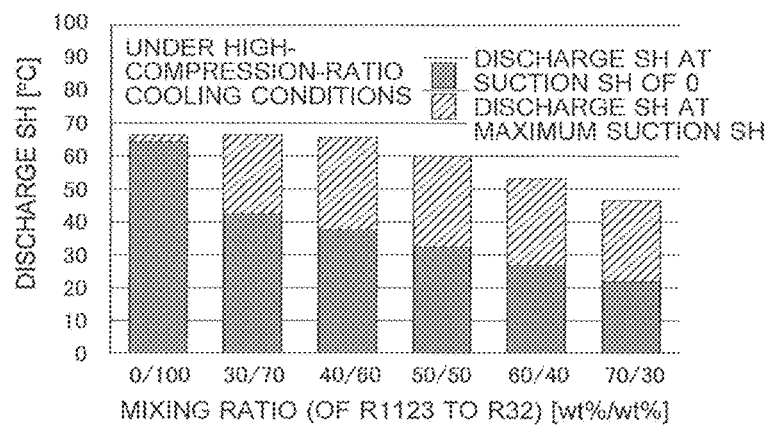
FIG. 9A is a graph illustrating discharge SHs in operations under high-compression cooling conditions with varied mixing ratios at a quality of 1 at the suction inlet of the compressor in the air-conditioning apparatus of FIG. 1.
Figure 9B:
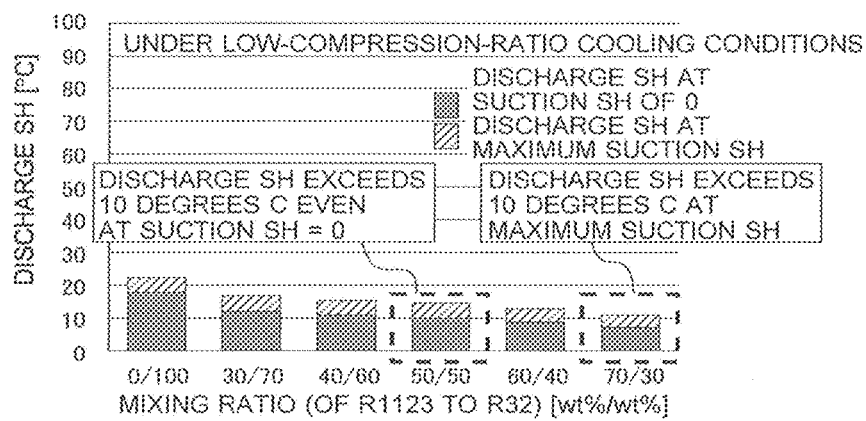
FIG. 9B is a graph illustrating discharge SHs in operations under low-compression cooling conditions with varied mixing ratios at a quality of 1 at the suction inlet of the compressor in the air-conditioning apparatus of FIG. 1.
Figure 9C:
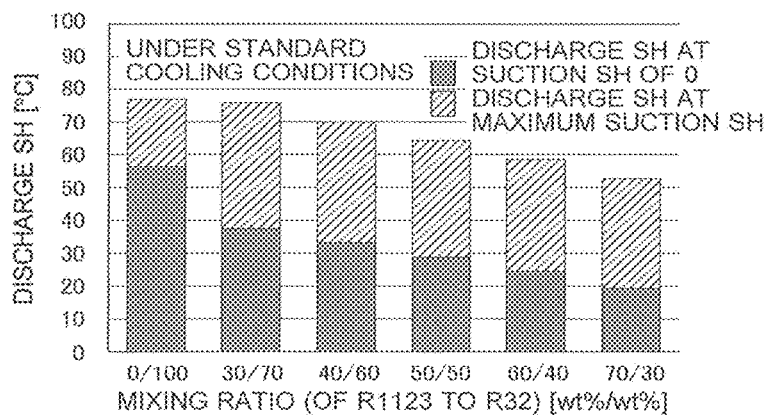
FIG. 9C is a graph illustrating discharge SHs in operations under standard cooling conditions with varied mixing ratios at a quality of 1 at the suction inlet of the compressor in the air-conditioning apparatus of FIG. 1.
Figure 9D:
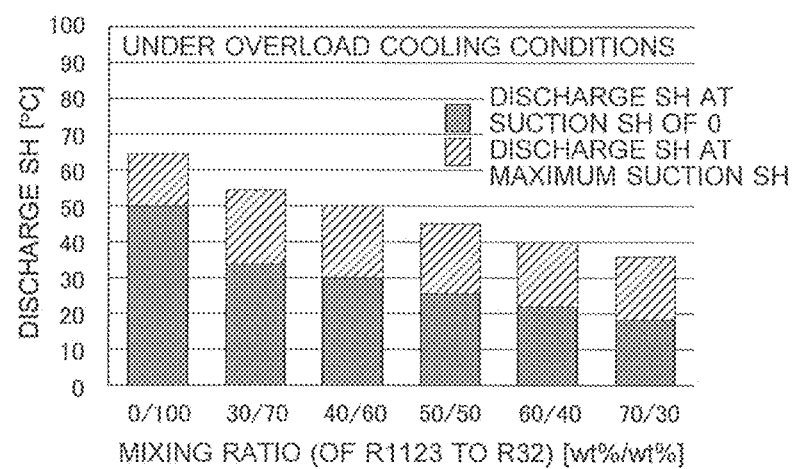
FIG. 9D is a graph illustrating discharge SHs in operations under overload cooling conditions with varied mixing ratios at a quality of 1 at the suction inlet of the compressor in the air-conditioning apparatus of FIG. 1.

FIG. 9A is a graph illustrating discharge SHs in operations under high-compression cooling conditions with varied mixing ratios at a quality of 1 at the suction inlet of the compressor in the air-conditioning apparatus of FIG. 1. FIG. 9B is a graph illustrating discharge SHs in operations under low-compression cooling conditions with varied mixing ratios at a quality of 1 at the suction inlet of the compressor in the air-conditioning apparatus of FIG. 1. FIG. 9C is a graph illustrating discharge SHs in operations under standard cooling conditions with varied mixing ratios at a quality of 1 at the suction inlet of the compressor in the air-conditioning apparatus of FIG. 1. FIG. 9D is a graph illustrating discharge SHs in operations under overload cooling conditions with varied mixing ratios at a quality of 1 at the suction inlet of the compressor in the air-conditioning apparatus of FIG. 1.

In FIGS. 9A to 9D, the horizontal axis represents the mixing ratio of R1123 to R32 [wt %/wt %] and the vertical axis represents the discharge SH [degrees C.]. In FIGS. 9A to 9D, each filled block indicates a discharge SH at a suction SH of 0 and each obliquely hatched block indicates a discharge SH at a maximum suction SH.

As is apparent from FIGS. 9A to 9D, the discharge SHs in the cooling operations generally tend to be lower than those in the heating operations. The discharge SHs are lowest under the low-compression-ratio cooling conditions illustrated in FIG. 9B among the cooling operation conditions. However, so long as the mixing ratio of R1123 is 50 wt % or less, the discharge SH is 10 degrees C. or higher even at a suction SH of 0 under the low-compression-ratio cooling conditions, where the discharge SH is low. As described above, so long as the mixing ratio of R1123 is 50 wt % or less, a discharge SH of 10 degrees C. or higher can be provided in the cooling operation as well as the heating operation. As illustrated in FIG. 9B, when the mixing ratio of R1123 is 70 wt % or less, the discharge SH is 10 degrees C. or higher at a maximum suction SH (substantially equal to the outdoor air temperature).

As is understood from FIGS. 6 to 9, to satisfy the cooling or heating conditions where the refrigerant sucked into the compressor has a quality of 1.0 or greater and the upper limit of the discharge temperature is set to 120 degrees C., a refrigerant mixture inclusive of 30 wt % to 50 wt % R1123 has to be used.

As described with reference to FIG. 9B, if the suction SH is maximum (substantially equal to the outdoor air temperature), that is, if the suction SH is equal to or lower than the outdoor air temperature, a suction SH of 10 degrees C. or higher can be provided as long as the mixing ratio of R1123 is 30 wt % or more and 70 wt % or less.

An operation of the air-conditioning apparatus according to Embodiment 1 with the above-described configuration will now be described.

The controller 100 of the air-conditioning apparatus controls the frequency of the compressor 11, the opening degree of the expansion valve 21, the rotation speed of the outdoor fan 14, and the rotation speed of the indoor fan 23 on the basis of temperatures detected by the temperature detecting units 15, 16, and 24.

In addition, the controller 100 controls at least one of the frequency of the compressor 11, the opening degree of the expansion valve 21, the rotation speed of the outdoor fan 14, and the rotation speed of the indoor fan 23 such that the discharge temperature of the refrigerant discharged from the compressor 11 is 120 degrees C. or lower.

Furthermore, the controller 100 controls at least one of the frequency of the compressor 11, the opening degree of the expansion valve 21, the rotation speed of the outdoor fan 14, and the rotation speed of the indoor fan 23 on the basis of the discharge temperature and temperatures detected by the indoor temperature detecting unit and the outdoor air temperature detecting unit, which are not illustrated in FIG. 1, such that the indoor temperature reaches a set target temperature.

Figure 10:
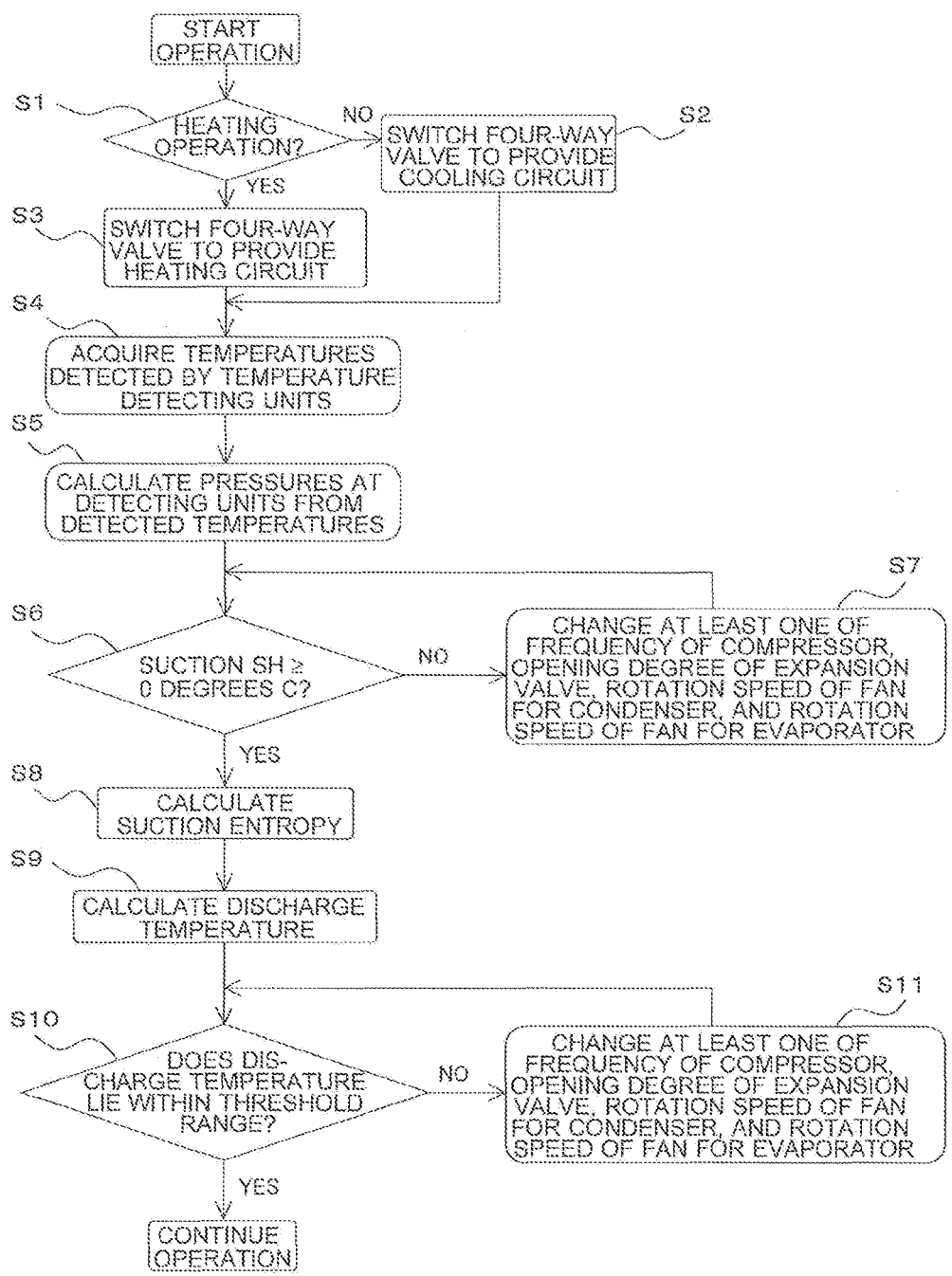
FIG. 10 is a flowchart illustrating an operation of the air-conditioning apparatus according to Embodiment 1 of the present invention.

FIG. 10 is a flowchart illustrating the operation of the air-conditioning apparatus according to Embodiment 1 of the present invention. The operation of the air-conditioning apparatus will be described below with reference to FIG. 10. In the following description, a distinction between the outdoor heat exchanger 13 and the indoor heat exchanger 22 will not be made and the heat exchanger will be described as either of an evaporator and a condenser, which suggest their functions.

The controller 100 determines, based on information input from, for example, an external device, whether the refrigeration cycle is intended to perform the cooling operation or the heating operation (S1).

When determining that the refrigeration cycle is intended to perform the heating operation, the controller 100 switches the four-way valve 12 to provide a heating circuit (S3). When determining that the refrigeration cycle is intended to perform the cooling operation, the controller 100 switches the four-way valve 12 to provide a cooling circuit (S2). The controller 100 acquires temperatures detected by the temperature detecting units 15, 16, and 24 (S4). The controller 100 then calculates pressures (a suction pressure, a low-pressure side pressure, and a high-pressure side pressure) at the units on the basis of the acquired temperatures by using a predetermined relational expression between refrigerant temperature and pressure (S5).

Then, the controller 100 determines whether the suction SH is 0 degrees C. or higher (S6). How to calculate the suction SH is as described above.

If the suction SH is lower than 0 degrees C., the controller 100 proceeds to S7. If the suction SH is 0 degrees C. or higher, the controller 100 proceeds to S8.

A suction SH of lower than 0 degrees C. indicates a state in which the refrigerant does not completely evaporate in the evaporator (the outdoor heat exchanger 13 in the heating operation or the indoor heat exchanger 22 in the cooling operation) and the refrigerant is sucked into the compressor 11, that is, the liquid back occurs. The controller 100 therefore changes at least one of the frequency of the compressor 11, the opening degree of the expansion valve 21, the rotation speed of the outdoor fan 14, and the rotation speed of the indoor fan 23 (S7). Specifically, the controller 100 performs control to increase the frequency of the compressor 11, reduce the opening degree of the expansion valve 21, or increase the rotation speed of the fan (the outdoor fan 14 in the heating operation or the indoor fan 23 in the cooling operation) for the evaporator such that the suction SH is increased.

The controller 100 then returns to S6 and again determines whether the suction SH is 0 or higher. A suction SH of lower than 0 indicates that the liquid back state is not removed. The controller 100 again performs processing in S7. On the other hand, when determining that the suction SH is 0 or higher, the controller 100 determines that the liquid back state is removed and then performs processing in S8.

In S8, the controller 100 calculates suction entropy from the temperature and the pressure of the refrigerant at the position prior to the suction inlet of the compressor. The suction entropy in each of the heating operation and the cooling operation is calculated based on a suction temperature detected by the temperature detecting unit 15 and a suction pressure calculated from the suction temperature.

After calculation of the suction entropy in S8, the controller 100 calculates a discharge temperature (S9). The discharge temperature is calculated as follows. The controller 100 calculates an ideal discharge temperature on the assumption that the change of the refrigerant in the compressor 11 is isentropic change, and corrects the discharge temperature by using a compressor efficiency, thus obtaining the corrected discharge temperature.

Specifically, the ideal discharge temperature in the heating operation is calculated from a high-pressure side pressure obtained through saturation conversion from a temperature detected by the temperature detecting unit 24, a suction pressure converted from a suction temperature detected by the temperature detecting unit 15, and the suction temperature. The ideal discharge temperature in the cooling operation is calculated from a high-pressure side pressure obtained through saturation conversion from a temperature detected by the temperature detecting unit 16, a suction pressure converted from a suction temperature detected by the temperature detecting unit 15, and the suction temperature. In this case, the ideal discharge temperature is corrected on the assumption that the compressor efficiency is 0.7, thus obtaining the corrected discharge temperature. Another temperature detecting unit may be provided to detect a discharge temperature.

Then, the controller 100 determines whether the discharge temperature obtained in S9 lies within a predetermined range (hereinafter, referred to as a "threshold range") (S10). An upper temperature limit of the threshold range is 120 degrees C., which is the heat resistance temperature of the motor parts, and a lower temperature limit thereof is a temperature at which the discharge SH is 10 degrees C. or higher. In other words, the lower temperature limit in the heating operation is a temperature obtained by adding the discharge SH to a temperature detected by the temperature detecting unit 16. The lower temperature limit in the cooling operation is a temperature obtained by adding the discharge SH to a temperature detected by the temperature detecting unit 24.

When the controller 100 determines that the discharge temperature obtained in S9 lies outside the threshold range, the controller 100 changes at least one of the frequency of the compressor 11, the opening degree of the expansion valve 21, the rotation speed of the outdoor fan 14, and the rotation speed of the indoor fan 23 such that the discharge temperature lies within the threshold range (S11). On the other hand, if the discharge temperature lies within the threshold range, the controller 100 continues the operation.

Advantages of the air-conditioning apparatus according to Embodiment 1 with the above-described configuration will now be described.

Since the air-conditioning apparatus according to Embodiment 1 uses a refrigerant mixture inclusive of 30 wt % to 50 wt % ethylene-based hydrofluorocarbon refrigerant (e.g., R1123), if the refrigerant at the suction inlet has a quality of 1.0 or greater, the discharge temperature can be within the predetermined threshold range by controlling at least one of the frequency of the compressor 11, the opening degree of the expansion valve 21, the rotation speed of the outdoor fan 14, and the rotation speed of the indoor fan 23. Advantageously, while low GWP refrigerant is used, liquid back can be prevented, the reliability of, for example, the material of the compressor can be increased by preventing an excessive increase in discharge temperature, and the sliding parts of the compressor can be prevented from wearing and generating heat by avoiding an insufficient discharge SH.

Since the air-conditioning apparatus according to Embodiment 1 uses a refrigerant mixture inclusive of 30 wt % to 70 wt % ethylene-based hydrofluorocarbon refrigerant (e.g., R1123), if the suction SH of the refrigerant at the suction inlet is maximum (substantially equal to the outdoor air temperature), the discharge temperature can be within the predetermined threshold range by controlling at least one of the frequency of the compressor 11, the opening degree of the expansion valve 21, the rotation speed of the outdoor fan 14, and the rotation speed of the indoor fan 23. Advantageously, while low GWP refrigerant is used, liquid back can be prevented, the reliability of, for example, the material of the compressor can be increased by preventing an excessive increase in discharge temperature, and the sliding parts of the compressor can be prevented from wearing and generating heat by avoiding an insufficient discharge SH.

As described above, the air-conditioning apparatus according to Embodiment 1 causes the refrigerant at the suction inlet to have a quality of 1.0 or greater and thus can prevent liquid back.

The air-conditioning apparatus according to Embodiment 1 prevents liquid back to ensure that the refrigerant in a gas state flows into the compressor 11, thus preventing a reduction in viscosity of the refrigerating machine oil and degradation and failure of the sliding parts of the compressor caused due to wearing and heat generation of the sliding parts.

The air-conditioning apparatus according to Embodiment 1 ensures that the refrigerant in a gas state flows into the compressor 11, so that the refrigerant in the compressor 11 is less likely to change its state than the refrigerant in a two-phase state flowing into the compressor 11. This can result in an increase in control stability.

Since the air-conditioning apparatus according to Embodiment 1 uses a refrigerant mixture inclusive of 30 wt % to 50 wt % ethylene-based hydrofluorocarbon refrigerant, if the refrigerant at the suction inlet has a quality of 1.0 or greater, the discharge temperature can be made lower than that in a case where R32 is used as a single refrigerant and an operation is performed with the same saturation temperature.

In the air-conditioning apparatus according to Embodiment 1, the upper temperature limit of the threshold range of the discharge temperature is 120 degrees C. Consequently, the refrigerating machine oil and the material, coating, and substrate of the compressor can be prevented from degrading. This can lead to increased reliability of the compressor.

In the air-conditioning apparatus according to Embodiment 1, the lower temperature limit of the threshold range of the discharge temperature is set such that a discharge SH of 10 degrees C. or higher, which is determined to provide a sufficient viscosity to the refrigerating machine oil, can be provided. Consequently, the sliding parts of the compressor can be prevented from wearing and generating heat.

Since the air-conditioning apparatus according to Embodiment 1 uses refrigerant inclusive of ethylene-based hydrofluorocarbon refrigerant (e.g., R1123 refrigerant), a refrigeration cycle capable of reducing GWP can be formed.

Since the air-conditioning apparatus according to Embodiment 1 uses a refrigerant mixture of R1123 and R32 and the refrigerant mixture is a near-azeotropic refrigerant mixture, a temperature change associated with a phase change can be eliminated.

Since the air-conditioning apparatus according to Embodiment 1 uses low GWP refrigerant, if the refrigerant leaks from the air-conditioning apparatus, an additional amount of refrigerant can be supplied to the apparatus with no need to collect the leaked refrigerant.

If each of the outdoor heat exchanger 13 and the indoor heat exchanger 22 of the air-conditioning apparatus according to Embodiment 1 described above is a heat exchanger including cylindrical pipes, an inside cross-sectional area of 5.3 mm$^2$ or more of each cylindrical pipe can reduce pressure loss inside the pipe. The reduction of the pressure loss inside the pipe results in a reduction in high-pressure side pressure, thus reducing the discharge temperature. Furthermore, an inside cross-sectional area of 65.3 mm$^2$ or less of the cylindrical pipe can prevent an excessive increase in size of the heat exchanger and an increase in amount of refrigerant enclosed in the apparatus.

If each of the outdoor heat exchanger 13 and the indoor heat exchanger 22 of the air-conditioning apparatus according to Embodiment 1 described above is a heat exchanger including flat multi-hole pipes, an inside cross-sectional area of 0.8 mm$^2$ or more of the flat multi-hole pipes can reduce pressure loss inside the pipes. The reduction of the pressure loss inside the pipes results in a reduction in high-pressure side pressure, thus reducing the discharge temperature. Furthermore, an inside cross-sectional area of 4.8 mm$^2$ or less of each hole of the flat multi-hole pipes can prevent an excessive increase in size of the heat exchanger and an increase in amount of refrigerant enclosed in the apparatus.

The above-described inside cross-sectional areas of the pipes are values based on the assumption that the heat exchangers are used for air-conditioning.

Preventing an excessive increase in size of the heat exchangers can reduce the production cost of the air-conditioning apparatus.

In addition, preventing an increase in amount of refrigerant enclosed in the apparatus can reduce the production cost of the air-conditioning apparatus.

Embodiment 2

Embodiment 2 differs from Embodiment 1 in detecting units for detecting a refrigerant state. The other components of a refrigeration cycle in Embodiment 2 are the same as those in Embodiment 1. The difference between Embodiment 2 and Embodiment 1 will be mainly described below.

Figure 11:
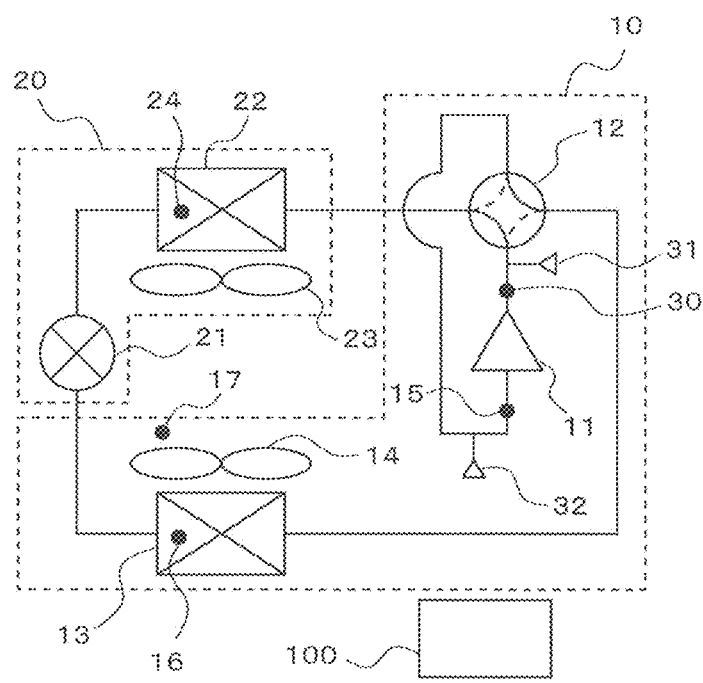
FIG. 11 is a diagram illustrating a refrigerant circuit of an air-conditioning apparatus according to Embodiment 2 of the present invention.

FIG. 11 is a diagram illustrating a refrigerant circuit of an air-conditioning apparatus according to Embodiment 2 of the present invention.

The air-conditioning apparatus according to Embodiment 2 includes a temperature detecting unit 30, a pressure detecting unit 31, and a pressure detecting unit 32 in addition to the same components as those of the air-conditioning apparatus according to Embodiment 1 illustrated in FIG. 1. The temperature detecting unit 30 is disposed between the discharge side of the compressor 11 and the four-way valve 12, in particular, on an outer surface of the pipe in the vicinity of an outlet of the compressor 11. The temperature detecting unit 30 detects a discharge temperature of the compressor 11. The temperature detecting unit 31 is disposed between the discharge side of the compressor 11 and the four-way valve 12, in particular, in the vicinity of the outlet of the compressor 11. The temperature detecting unit 31 detects a suction pressure of the compressor 11. The pressure detecting unit 32 is mounted between the suction side of the compressor 11 and the four-way valve 12, in particular, in the vicinity of the inlet of the compressor 11. The pressure detecting unit 32 detects a suction pressure of the compressor 11.

Furthermore, the controller 100 is connected to the temperature detecting unit 30, the pressure detecting unit 31, and the pressure detecting unit 32 such that the controller 100 can receive detection signals from these detecting units. The controller 100 controls at least one of the frequency of the compressor 11, the opening degree of the expansion valve 21, the rotation speed of the outdoor fan 14, and the rotation speed of the indoor fan 23 on the basis of calculation results obtained from detection results of the temperature detecting units 15, 16, 24, and 30, and the pressure detecting units 31 and 32.

Since the air-conditioning apparatus according to Embodiment 2 includes the pressure detecting units 31 and 32, the apparatus can directly determine a high-pressure side pressure and a low-pressure side pressure without estimating these pressures on the basis of detected temperatures as in Embodiment 1 described above. In addition, the discharge temperature can be directly determined by the temperature detecting unit 30. Consequently, processing steps S5, S8, and S9 in the flowchart of FIG. 10 are omitted.

Advantages of the air-conditioning apparatus according to Embodiment 2 with the above-described configuration will now be described.

The air-conditioning apparatus according to Embodiment 2 offers the same advantages as those in Embodiment 1. In addition, since the apparatus includes the temperature detecting unit 30, the discharge temperature of the compressor 11 can be accurately detected. Consequently, control can be achieved with more certainty such that the discharge temperature close to 120 degrees C., which is the upper temperature limit, does not exceed the upper temperature limit.

Since the pressure detecting units 31 and 32 are provided, a high-pressure side pressure and a low-pressure side pressure can be accurately detected. Consequently, a discharge temperature can be accurately calculated in S9 in FIG. 10. Furthermore, if an actuator is controlled such that both the calculated discharge temperature and the discharge temperature detected by the temperature detecting unit 30 are lower than or equal to the predetermined upper temperature limit of the discharge temperature, control can be achieved with more certainty such that the discharge temperature does not exceed the upper temperature limit.

Although Embodiments 1 and 2 have been described on the assumption that the refrigeration cycle apparatus is the air-conditioning apparatus, the refrigeration cycle apparatus may be, for example, a cooling apparatus that cools, for example, a refrigerator/freezer warehouse, or may be a water heating apparatus.

The invention claimed is:

1. A refrigeration cycle apparatus comprising:
    a refrigerant circuit including a compressor, a condenser, a pressure reducing device, and an evaporator;
    a first fan configured to blow air to the condenser;
    a second fan configured to blow air to the evaporator;
    an outdoor air temperature detecting unit configured to detect an outdoor air temperature; and
    a controller configured to control at least one of a frequency of the compressor, an opening degree of the pressure reducing device, a rotation speed of the first fan, and a rotation speed of the second fan, such that the refrigerant sucked into the compressor has a suction superheat degree, which is a degree of superheat of the refrigerant sucked into the compressor, the suction superheat degree being lower than or equal to a difference between the outdoor air temperature detected by the outdoor air temperature detecting unit and a saturated gas temperature of the refrigerant,
    wherein the refrigerant circuit is configured for use with a refrigerant mixture inclusive of 30 wt % to 70 wt % ethylene-based hydrofluorocarbon refrigerant.

2. The refrigeration cycle apparatus of claim 1, wherein the controller is configured to perform control such that a discharge temperature of the compressor lies within a predetermined range.

3. The refrigeration cycle apparatus of claim 2, wherein the predetermined range has an upper temperature limit of 120 degrees C. and a lower temperature limit at which the refrigerant discharged from the compressor has a degree of superheat of 10 degrees C.

4. The refrigeration cycle apparatus of claim 1, further comprising a suction superheat degree detecting unit configured to detect the suction superheat degree,
    wherein the suction superheat degree detecting unit includes
    a first temperature detecting unit attached to a pipe located between an outlet of the evaporator and a suction inlet of the compressor, the first temperature detecting unit being configured to detect a suction temperature, and
    a second temperature detecting unit attached to a pipe located between an outlet of the pressure reducing device and the outlet of the evaporator, the second temperature detecting unit being configured to detect an evaporating temperature, and
    wherein the suction superheat degree detecting unit is configured to detect the suction superheat degree, based on a difference between the detected temperatures of the first temperature detecting unit and the second temperature detecting unit.

5. The refrigeration cycle apparatus of claim 4, wherein the second temperature detecting unit is disposed at a position between a refrigerant inlet of a pipe included in the evaporator and a location intermediate a length of the pipe.

6. The refrigeration cycle apparatus of claim 1, further comprising
    a four-way valve configured to switch refrigerant flow directions in the refrigerant circuit to achieve either of a cooling operation and a heating operation.

7. The refrigeration cycle apparatus of claim 1, wherein the refrigerant mixture is a mixture of the ethylene-based hydrofluorocarbon refrigerant and R32 refrigerant.

* * * * *